United States Patent [19]
Didelot et al.

[11] 3,908,032
[45] Sept. 23, 1975

[54] PROCESS FOR THE CONTINUOUS MANUFACTURE OF SOFT CANDIES

[75] Inventors: Pierre Didelot; Guy Lasserre, both of Paris; Georges Letourneau, Lagny; Jean Marie Sudan, Asnieres, all of France

[73] Assignee: General Foods France, Montreuil-sous-Bois, France

[22] Filed: Dec. 19, 1973

[21] Appl. No.: 426,152

[30] Foreign Application Priority Data
Dec. 20, 1972  France .............................. 72.45492

[52] U.S. Cl. ................ 426/660; 426/516; 426/517; 426/519
[51] Int. Cl.² ........................ A23G 3/30; A23L 1/09
[58] Field of Search ........... 426/380, 168, 363, 214, 426/350, 516, 517, 519

[56] References Cited
UNITED STATES PATENTS

| | | | |
|---|---|---|---|
| 2,726,960 | 12/1955 | Bolanowski......................... | 426/350 |
| 2,847,311 | 8/1958 | Doumak et al. ................ | 426/168 X |
| 3,669,030 | 6/1972 | Waters............................... | 426/380 |
| 3,806,617 | 4/1974 | Smylie et al. .................. | 426/516 X |

*Primary Examiner*—Arthur D. Kellogg
*Assistant Examiner*—Arthur L. Corbin
*Attorney, Agent, or Firm*—B. P. Struzzi; T. V. Sullivan; H. J. Newby

[57] ABSTRACT

A process is provided for the continuous manufacture of soft candy (pate molle) in which a paste of sugar, glucose, fat and binder is quickly formed by concentration of an aqueous solution and cooled, the paste is worked in a mixer, homogenized and extruded for further cooling, further homogenizing, further extrusion and final cooling.

5 Claims, 4 Drawing Figures

PROCESS FOR THE CONTINUOUS MANUFACTURE OF SOFT CANDIES

BACKGROUND OF THE INVENTION

1. Field of the Invention

The present invention relates to a process and apparatus for making candy and more particularly, for making so-called "soft candies" (pate molle), sometimes also referred to as "chewing paste".

Soft candy, unlike hard candy of the "acidulous" type, can readily be chewed in the mouth and is slowly dissolved in saliva during such chewing. Unlike "chewing gum", it is eventually entirely dissolved in the mouth and leaves no solid residue. It is to be contrasted also with fondant which, though soft, is essentially sugar and also with gelatinous candy which has a high content of gelatin and a characteristic gelatinous texture.

Soft candy essentially comprises sugar, glucose, fat and gelatin. In addition, one or more flavoring agents, an authorized acidulating agent and suitable coloring matter are usually added in order to impart the desired flavor and color. The amounts of the various components may be within relatively broad ranges depending upon the desired shelf-like characteristics. However, as a general rule, the amounts are kept within the following ranges (by weight):

| | | | | |
|---|---|---|---|---|
| sugar | from | 10% | to | 85% |
| glucose | | 10% | | 85% |
| fat | | 1% | | 20% |
| plastic binder (for example gelatin) | | 0.5% | | 5% |
| flavor | | 0.1% | | 3% |
| acidulating agent | | 0.2% | | 2% |
| color | | 0.001% | | 0.1% |
| water | balance | | | |

Those skilled in the art are well aware of appropriate proportions whether or not within the above range. The proportions are those which give the characteristic texture of a "soft candy" of the "pate molle" type.

In soft candy, sugar and glucose are essentially present in crystallized form, fat and plastic binder being provided to render the paste coherent and elastic. As a plastic binder, gelatin is advantageously used but the other gums or gelatinous substances known to the art can be employed.

2. Description of the Prior Art

One process for making soft candy comprises concentrating an aqueous syrup of sugar and glucose, adding fat, binder, flavor, acidulating agent and color to the resulting pasty mass, mixing the pasty mass to obtain a uniform composition, cooling the mass to the appropriate temperature, beating with or without stretching and with or without mixing the mass to induce formation of crystallization nuclei, allowing the mass to stand and cool in order to cause sugar and glucose crystals to grow, homogenizing and shaping the cooled mass into the appropriate shape for feeding a cutting-packaging machine. This is generally effected by a roll-making machine of the type used in confectionery.

Such process tends not to be satisfactory for continuously making candy, as as a relatively long period is required to achieve sufficient crystallization of sugar and glucose, and consequently the length of the concentration step results in production of inverted sugar delaying crystallization. Also the resulting candy although having the desired plasticity upon completion of the manufacturing process is found to become rapidly hard and thereby to lose its plasticity after a relatively short storage period. Such a drawback is especially undesirable in products which would otherwise be satisfactorily preserved, because said products would be perfectly adapted to consumers if such hardening phenomenon did not render them unsuitable.

In the prior art a concentrate is formed from an aqueous solution of sugar and glucose which was cooled and worked on kneading tables and thereafter extruded. This working was not readily adaptable to continuous processes but attempts to use continuous kneading devices have hitherto proved unsuccessful. Various cooling means and mixers have been suggested for different aspects of the candy art and reference is made to such individual patent references as French Patent 1,442,989; French patent 1,373,158; U.S. Pat. No. 2,507,477; British Patent 968,733; and French Patent 1,367,452. These references are either not directed to "pate molle" candy or merely disclose individual cooling steps or mixing steps. For example, U.S. Pat. No. 2,868,144 discloses a mixer/extruder but in the context of an apparatus under vacuum to deaerate a dough. There is no disclosure in the context of a controlled mixing to form a crystalline structure nor control of cooling stages.

SUMMARY OF THE INVENTION

There is a need for a process for making soft candy, the plasticity of which is not substantially affected upon aging, and which thus remains commercially suitable after an extended storage period.

There is also a need for a process adapted to continuous manufacture of candies with a shortened manufacturing period of time.

There is a further need for an apparatus for continuously making candies.

According to the invention there is provided a continuous process for making soft candy in which an aqueous solution comprising sugar, glucose, fat and binder is rapidly concentrated to a pasty consistency under conditions minimizing formation of invert sugar, the paste is subjected to an initial rapid cooling, blended under conditions which mix and stretch the paste to initiate formation of crystallization nuclei throughout the paste, then homogenized under pressure and extruded, the extruded paste is subjected to further cooling to a temperature which is intermediate between the temperature after extrusion and ambient temperature, the paste is further homogenized and extruded under pressure and subjected to final cooling to ambient temperature.

There is also provided a continuous apparatus for the manufacture of soft candy comprising a concentrator for an aqueous solution of sugar and glucose adapted to concentrate the solution to a pasty consistency in a period less than that at which substantial amounts of invert sugar are formed, initial cooling means, a blender/extruder, a further cooling means, a second extruder and a third cooling means.

DESCRIPTION OF THE DRAWINGS

In the following description there is reference to the accompanying drawings which illustrate and exemplary apparatus for the carrying out of the process. This description is only intended as exemplary and not as a limitation on the protection to be afforded by the claims of the present application.

In the accompanying drawings.

To the extent that FIGS. 2, 3 and 4 are descriptions in greater detail of FIG. 1 the same numerals have been used to identify similar parts wherever possible.

DETAILED DESCRIPTION

Figure 1:
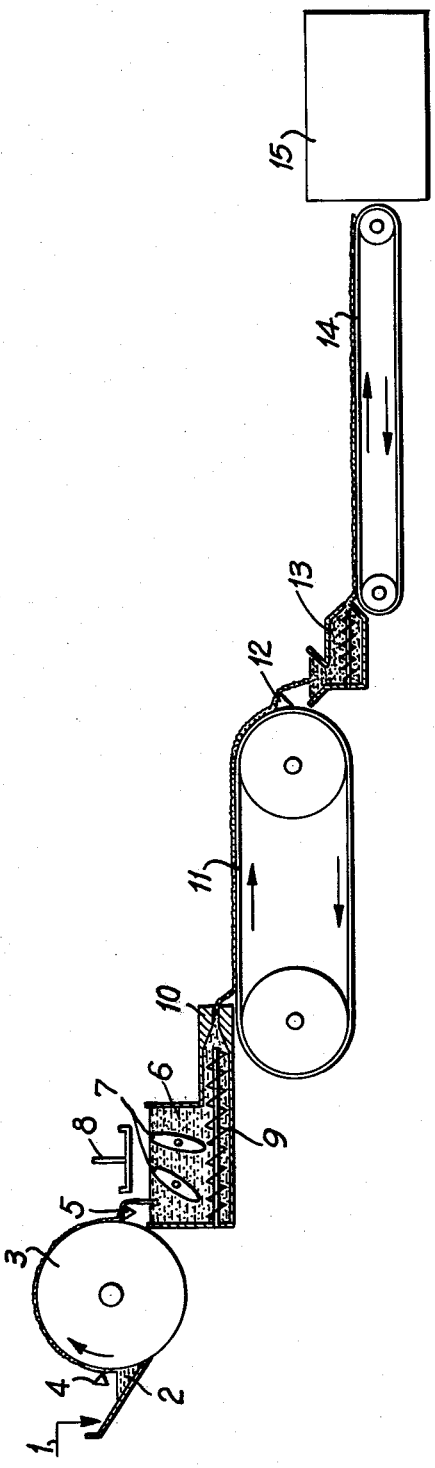
FIG. 1 is a summarized diagram of a system for the invention.

A continuous process comprises the following sequential steps:

1. Quickly concentrating to avoid formation of inverted sugar and forming a homogeneous mass which is freee-flowing at high temperature and comprises sugar, glucose, fat, gelatin and water.
2. Cooling the free-flowing mass to impart a paste consistency to it.
3. Inducing formation of crystallization nuclei through the paste.
4. Mixing, further homogenizing under pressure, and shaping into a paste web.
5. Cooling the paste web to a substantially intermediate temperature below the temperature of the paste and the room temperature.
6. Mixing, further homogenizing under pressure and extruding, particularly in a shape of a rod of suitable size for packaging.
7. Cooling the rod substantially to room temperature.
8. Cutting the rod into suitable sized candy units.

With such a process the period of time required to bring the mass to the desired plasticity is substantially shortened, whereby the process can be adapted to continuous manufacture, and that the storage period during which the obtained candy can be preserved without losing its original plasticity is quite substantially extended.

The process essentially therefore substitutes for a batchwise process comprising slow cooking, slow cooling, stretching and slow cooling, a continuous process comprising quick cooking, followed by quick cooling, mixing-stretching with homogenization under pressure, quick cooling, further homogenization under pressure and quick cooling.

The coloring matter, flavoring agents and acidulating agent can, in principal, be added at any stage in the sequential steps, under such conditions that the product can be satisfactorily distributed through the mass so as to provide a homogeneous paste.

Coloring agents are usually relatively heat-insensitive and therefore can be distributed through the free-flowing mass just before the initial cooling. A color distribution, as uniform as possible, is thus achieved, which is commercially critical. On the contrary, flavoring agents are relatively heat-sensitive and it is therefore advantageous to add them into the previously cooled paste at such a process stage that a sufficiently homogeneous distribution of the flavoring matters through the paste will nevertheless be provided. As a practical matter, quite satisfactory results are obtained when the flavoring agents are added after the first cooling.

The various coolers can be of known types capable of providing a sufficiently rapid cooling of the paste shaped either into a web or a rod. In particular, either a rotary drum apparatus, interiorly cooled by a cool fluid flow, or an endless belt conveyor provided with a convection, conduction or forced air cooling device, or scraped-surface cooling apparatus, or any other suitable cooling means, can be advantageously used. Most suitably the first cooler is a rotary drum cooler.

The mixer/extruder is particularly significant. The rate and period of mixing and the rate of removal from the mixing by the extruder must be such that the desired crystallinity and texture are obtained. The adjustment of the preceding cooling and the blending are very important but one skilled in the art would have no difficulty in the light of the general teaching of this application in adjusting the operation of the cooler and mixer and extruder to give a desired texture for a given composition.

A very suitable mixer is a blender which comprises parallel axis stirrers in opposed rotation inside a tank with take-off by a screw extruder. The screw extruder has preferably a web forming nozzle. The second extruder after the next cooling step preferably has a nozzle to form rods of a cylindrical or rectangular cross-section.

Sugar from a silo 101 is fed together with water, glucose and steam to dissolver 102. The water is metered by pump P, the symbol P being used elsewhere in the accompanying drawings for metering pumps. From the dissolver 102 the solution is fed to stock tank 103. In mixer 105 a solution of gelatin and water is formed and fed to stock tank 103', fat is held in stock tank 104, color is held in stock tank 106 and flavors in stock tanks 107. The solution or syrup of sucrose, and glucose, the fat, gelatin solution and the coloring and flavoring materials from the respective stock tanks are fed to volume metering system 108 which feeds the appropriate amounts of each component to the subsequent portions of the system. The gelatin solution, and a blend of sugar syrup and fat are fed to an appropriate rapid condensation apparatus preferably a thin film condenser. In this condenser the mixture of sugar, glucose, fat, gelatin and water are concentrated to a paste of the desired concentration. Coloring agent can also be added prior to the concentrator. The concentration should be effected in a sufficiently short period to avoid formation of an excessive amount of invert sugar. In practice it has been found that this concentration should be effected in less than ten seconds. Other appropriate concentrators can be used but thin film concentrators give a particularly satisfactory result. The concentrated paste discharged from the concentrator can be at a temperature of about 130°C. at which temperature it has the consistency of a free-flowing paste. This paste is fed to a feeding chute 2 which discharges onto the external surface of a rotating drum 3. This drum can be cooled by a flow of water through the interior. A doctor blade 4 can be provided to spread the paste and determine the thickness of the layer carried by the drum.

The degree of cooling to be effected by the drum will be correlated with the conditions which will be later described for the mixer extruder but in general the temperature will probably be dropped to approximately 70°C. so as to provide a crystallization in the paste.

Figure 3:
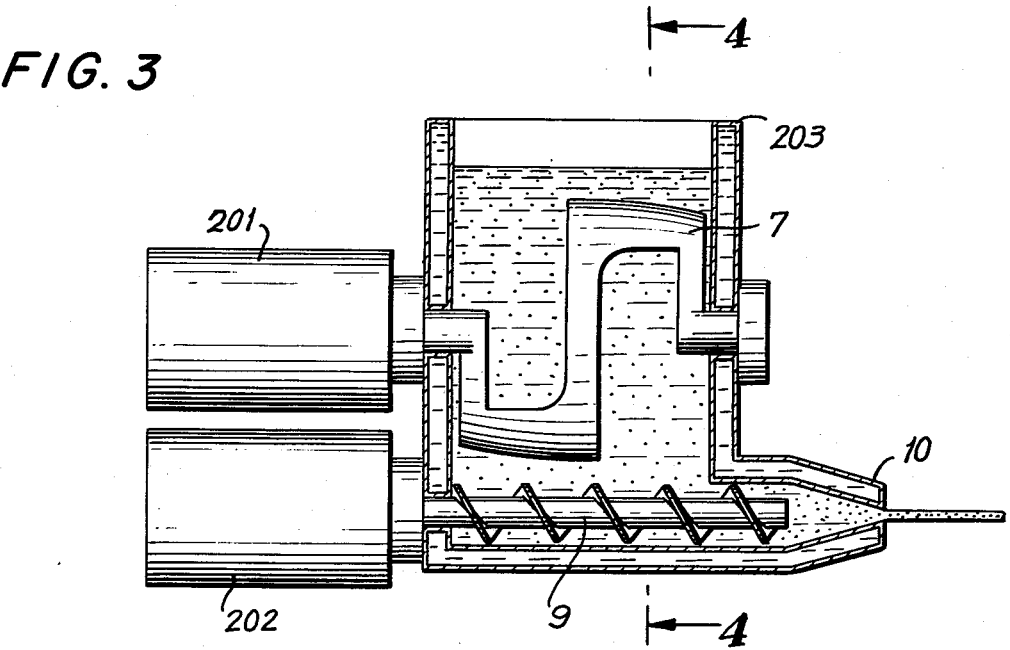
FIG. 3 is a mixer/extruder in greater detail.
Figure 4:
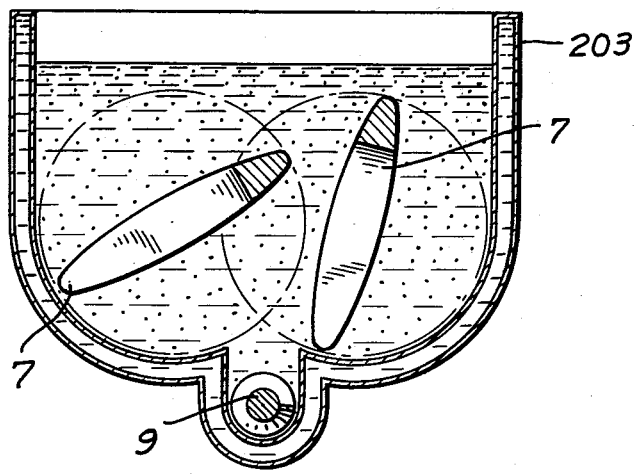
FIG. 4 is a cross-section of FIG. 3 on the line 4—4.

A doctor blade 5 at the other side of the drum strips the paste web from the drum and directs it to the mixer extruder 6. As shown more clearly in FIGS. 3 and 4, this mixer extruder preferably has a double wall and stirrer blade 7 driven by motor 201. These blades are therefore off center and effect both a blending and a stretching of the paste in the mixer. Flavoring agents from the metering system 108 can be added at this time as well as acidulating agents such as tartaric acid from feeder 8. As a result of the mixing by the blades and the subsequent extrusion the temperature on the paste will generally be increased to at least 70°C. The mixing and "stretching" effected by the blade induces formation of crystallization nuclei through the paste so as to provide the characteristic consistency of this type of candy. The paste after an appropriate blending time is removed by the feed screw 9 driven by motor 202 which homogenizes the paste under and forces it through extruder 10. At this point the web is at a temperature of at least 70°C. The extruder 10 feeds onto a belt cooler 11 preferably cooled by cold water. The operation of this cooler is so controlled that the temperature of the web leaving this belt is substantially intermediate between the temperature at the exit of the first extruder and ambient temperature.

Figure 2:
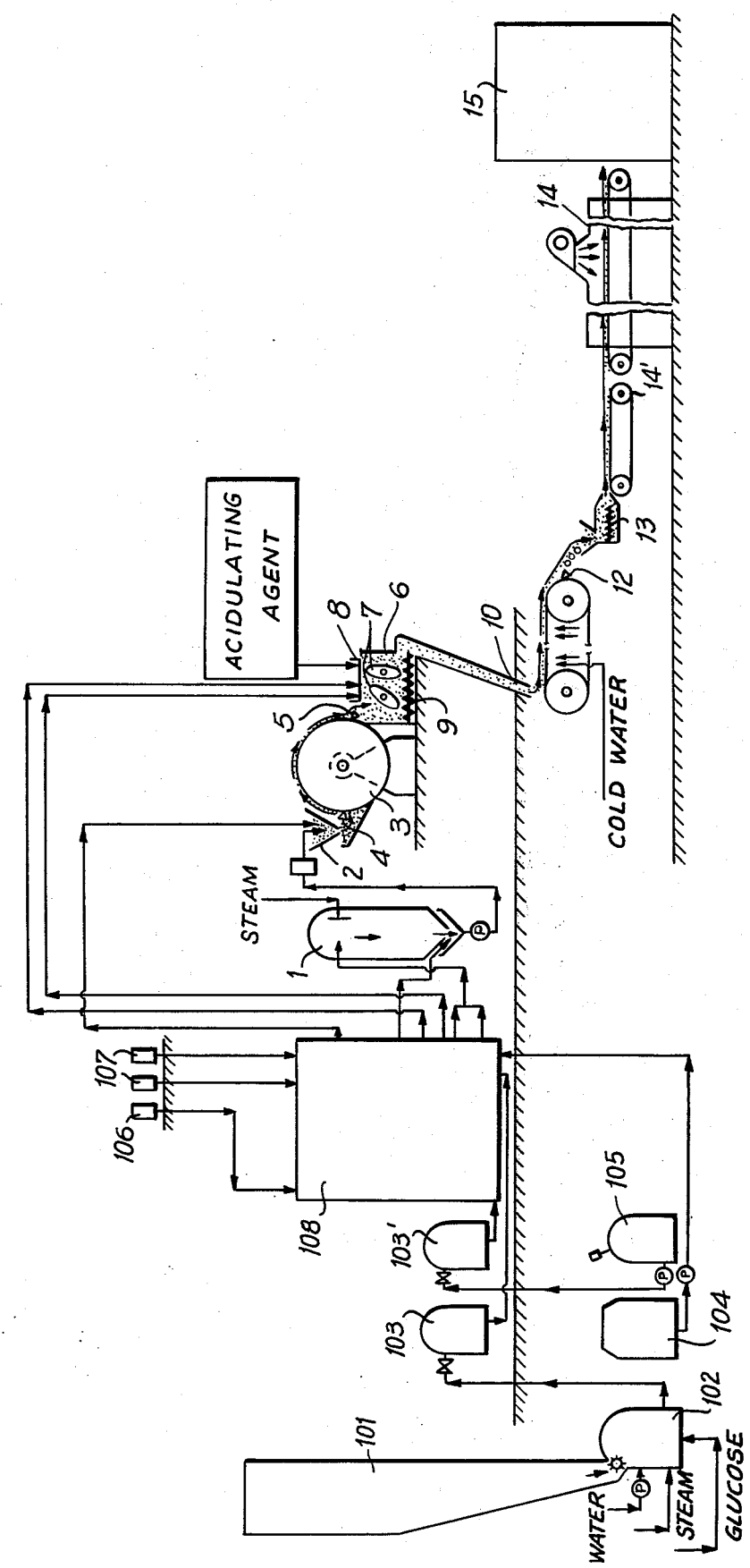
FIG. 2 is a detailed outline of the process sequence.

The web deposited on the belt is stripped from the belt 11 by blade 12 and fed to further extruder 13 which can be an extruder of a conventional type. In this extruder the paste is further homogenized and blended by the feeder screw of the extruder and then forced through one or more orifices in the extruder preferably to be shaped into one or more rods which pass to further cooler 14. As shown in FIG. 2 the rods can be deposited on an endless belt conveyor 14' which in turn feeds to a belt cooler cooled by air 14 where the paste is completely cooled to ambient temperature. The rods are discharged from this belt to cutting machines 15 and thereafter the candy can be packaged and bagged.

The proportions of the various components such as water, fat, sugar and glucose will generally be within the proportions indicated at the beginning of this application but such selection is well within the understanding of one normally practiced in the art. Equally the precise temperatures which will be used can be modified in accordance with the general practice of the art so as to insure that the desired consistency of the product is obtained.

What we claim is:

1. A continuous process for making soft candy comprising:
   a. preparing an aqueous solution of sugar, glucose, fat and binder;
   b. rapidly concentrating the solution to a free-flowing pasty consistency under conditions minimizing the formation of invert sugar;
   c. rapidly cooling the free-flowing paste of (b) to a temperature of about 70°C;
   d. mixing and stretching the cooled paste to induce formation of crystallization nuclei throughout the paste and to provide a homogeneous soft texture, said mixing and stretching effected at a temperature of about 70°C, in a blender having parallel axis stirrers in opposed rotation within a tank;
   e. homogenizing the paste under pressure;
   f. extruding the homogenized paste at a temperature of at least 70°C, in the form of a web onto a cooling belt;
   g. cooling the extruded paste web to a temperature substantially intermediate between the temperature after extrusion and ambient temperature;
   h. further homogenizing the cooled paste web and extruding the homogenized paste web in the form of one or more rods on to a cooling belt; and
   i. cooling the extruded rods of homogenized paste to ambient temperature.

2. A process according to claim 1, wherein said binder is gelatin.

3. A process according to claim 1, wherein at least one flavoring agent is added after the first cooling stage.

4. A process according to claim 3, wherein flavoring agent is added during the initial blending.

5. A process according to claim 1, wherein after the last cooling to ambient temperature the paste is formed into shaped candy units.

* * * * *